United States Patent [19]
Hendry

[11] 3,733,157
[45] May 15, 1973

[54] APPARATUS FOR MOLDING PLASTIC SHEET

[75] Inventor: James W. Hendry, Helena, Ohio

[73] Assignee: Sund-Borg Machines Corporation, Fremont, Ohio

[22] Filed: Aug. 3, 1970

[21] Appl. No.: 64,143

Related U.S. Application Data

[63] Continuation of Ser. No. 708,965, Feb. 28, 1968, abandoned.

[52] U.S. Cl. ..................425/149, 425/220, 425/253, 164/88, 425/259
[51] Int. Cl. .................................................B29d 7/02
[58] Field of Search................425/149, 150, 224, 425/246, 253, 259, 261, 220; 164/88, 276, 279

[56] References Cited

UNITED STATES PATENTS

| | | |
|---|---|---|
| 1,877,298 | 9/1932 | Goodwin.........................425/129 X |
| 2,066,846 | 1/1937 | McNeil..............................425/150 |
| 2,166,006 | 7/1939 | Harbord et al. .....................164/279 |
| 2,329,287 | 9/1943 | Miller.............................425/147 X |
| 2,798,253 | 7/1957 | Rhodes............................425/101 X |
| 3,011,214 | 12/1961 | Tollar et al. ......................425/449 X |
| 3,034,177 | 5/1962 | Hooper............................425/130 X |
| 3,281,903 | 11/1966 | Ross..................................164/88 X |
| 3,355,765 | 12/1967 | Hendry............................425/246 |
| 3,396,778 | 8/1968 | Jensen et al.......................164/88 X |

FOREIGN PATENTS OR APPLICATIONS

713,979 7/1965 Canada ...............................164/279

Primary Examiner—R. Spencer Annear
Attorney—James G. Watterson, Blythe D. Watts, James T. Hoffmann, Thomas E. Fisher, Lowell L. Heinke, Roy E. Raney, Linn J. Raney, Henry W. Collins and David A. Burge

[57] ABSTRACT

An apparatus for forming large surface area plastic sheets inside of a mold by introducing plastic from an injection molding machine, an extruder or other source of moldable plastic material, through a feed member positioned adjacent the mold. The feed member and the mold are relatively movable with respect to each other to progressively fill the mold cavity through a selected length thereof.

12 Claims, 17 Drawing Figures

INVENTOR.
JAMES W. HENDRY
BY Woodham, Blanchard & Flynn
ATTORNEYS

INVENTOR.
JAMES W. HENDRY

INVENTOR.
JAMES W. HENDRY
BY
Woodhams, Blanchard and Flynn
ATTORNEYS

APPARATUS FOR MOLDING PLASTIC SHEET

This application is a continuation of application Ser. No. 708,965 filed Feb. 28, 1968, now abandoned.

FIELD OF THE INVENTION

This invention relates to a plastics molding apparatus for forming plastic sheets of large surface area and, more particularly, relates to the continuous or progressive molding of plastic sheets utilizing relative movement between the mold and the feed member.

DESCRIPTION OF THE PRIOR ART

Prior to this invention, the normal method of molding plastic sheets has been to inject plastic into the central portion of a mold and progressively force the plastic material outwardly from the feed source to ultimately completely fill the mold cavity. However, this method has generally been unsatisfactory for the molding of large surface area plastic sheets.

In particular, if a molten plastic of high viscosity is being utilized, then the plastic material is unable to flow long distances without the use of extreme pressures which in turn requires large and expensive equipment. Further, even if high pressures are provided, the material often flows only slowly and is likely to cool and solidify before reaching the outer extremities of the mold cavity. This cooling and solidification within a mold makes it extremely difficult, if not impossible, to form large plastic sheets within a mold cavity.

It has been proposed that, in the case of thermoplastics, the mold be heated to prevent the plastic material from solidifying. While this maintains the material in a molten condition and permits complete filling of the desired mold cavity, maintaining some plastic materials, such as the ABS copolymers, in the molten condition for extended periods of time, which includes the time necessary to permit the formation of large sheets, causes a degradation or charring of the material. Thus, the plastic sheets so produced are commercially unacceptable. Further, this method requires ancillary heating apparatus and, therefore, is relatively expensive.

The above method has also proven unsatisfactory when used to form large sheets from thermosetting plastics. In thermosetting plastics, the solidification of the material is not dependent upon temperature but rather is dependent upon some other variable, such as time. Accordingly, when using such materials, it is generally not possible to maintain the material in a molten condition for a sufficient time to permit the material to flow to the outer extremities of the large mold cavity.

A second method of forming plastic sheets, utilized prior to this invention, has been to provide a fan-shaped extruding orifice and extrude plastic through this orifice, maintaining close control on the size of the orifice to form a plastic sheet of a desired thickness. Extruding through a narrow orifice for the purpose of making plastic sheet materials was generally unsatisfactory for preparing either wide or narrow sheets due to the changing tension on the plastic sheet, caused in part, by pulsations from the extruder. The changing tension made it impossible to provide sheets of uniform thickness and, in the extruding of relatively wide sheets, it was necessary to utilize an extremely large capacity plastic extruder. Also, in extruding through a narrow orifice, some of the plastic material had a tendency to accumulate on the sides of the orifice, resulting in degradation thereof. Some of this degraded material would then become mixed with the pure plastic resulting in a lack of uniformity in the completed plastic sheet due to the presence of degraded or charred particles therein.

It has become increasingly more important to be able to provide plastic sheets of large surface area in order to serve industries such as the automotive industry with plastic parts of sufficiently large dimension to be used as hoods, fenders, doors and the like. The advent of high impact, high heat distortion thermoplastics and blends thereof, such as polycarbonates, ABS copolymers, polyurethanes, polysulfonates, polysulfones, polyvinyl chlorides, polyphenylene oxides and the like, have made it commercially feasible to make plastic components that compare very favorably with steel. The commercial feasibility of plastic components is, however, dependent on the ability of the manufacturer to provide large, smooth, dimensionally stable sheets without the necessity of joining one sheet to another, such as by solvent welding or the like. In the majority of commercial applications, joined sheets are generally unacceptable due to the surface inperfections at their line of joinder.

Accordingly, it is an object of this invention to provide:

1. A method of molding large plastic sheets and an apparatus for performing this method.
2. A method and an apparatus, as aforesaid, capable of molding large plastic sheets having uniform physical and dimensional properties.
3. A method and an apparatus, as aforesaid, capable of molding large plastic sheets with precise control.
4. A method and an apparatus, as aforesaid, capable of progressively or continuously molding large plastic sheets.
5. A method and an apparatus, as aforesaid, capable of economically and efficiently molding large plastic sheets.
6. A method and an apparatus, as aforesaid, capable of molding large plastic sheets having a pattern in one or both surfaces thereof.
7. A method and an apparatus, as aforesaid, capable of molding large plastic sheets having a desired thickness variation or configuration across the width thereof.
8. A method and an apparatus, as aforesaid, capable of molding large plastic sheets within a range of relatively small to relatively large thicknesses.
9. A method and an apparatus, as aforesaid, capable of molding large plastic sheets having the width and length thereof substantially as large as desired.

Other objects and purposes of the invention will be apparent to persons acquainted with apparatus of this general type upon reading the following specification and inspecting the accompanying drawings.

BRIEF DESCRIPTION OF THE DRAWINGS

FIG. 12 is a cross-sectional view taken along the line XII—XII of FIG. 10, and illustrates one embodiment of a runner feeding member.

Certain terminology will be used in the following description for convenience in reference only and will not be limiting. The words "upwardly," "downwardly," "rightwardly" and "leftwardly" will designate directions in the drawings to which reference is made. The words "forwardly" and "rearwardly" will refer to the relative directions of movement during the sheet forming process, "forwardly" being the normal direction of movement of either the feed member or the mold member during the injection and molding of the plastic sheet. The words "inwardly" and "outwardly" will refer to directions toward and away from, respectively, the geometric center of the device and designated parts thereof. Said terminology will include the words above specifically mentioned, derivatives thereof and words of similar import.

SUMMARY OF THE INVENTION

In general, the objects and purposes of the invention are met by providing a molding apparatus and a method of molding plastic sheets wherein relative movement exists between a feed member and the mold cavity so as to progressively fill the mold from one end to the other, thereby forming a large plastic sheet having uniform physical and dimensional characteristics.

In one preferred form of the apparatus, the objects and purposes of this invention are met by providing a machine having a stationary feed member positioned above a movable table, which table has a large mold opening therein. The mold opening is formed in the upper surface of the table and is bounded on the sides thereof by means of upwardly extending sidewalls, the height of which determines the sheet thickness. A stationary dam member is positioned adjacent the feed member within the mold opening and extends across the mold opening in sliding engagement with the sidewalls thereof to define a small mold cavity between the stationary dam and the sidewalls of the movable table. The table moves forwardly relative to the feed member and relative to the stationary dam to progressively increase the size of the mold cavity. Simultaneous with the above movement, plastic material is injected into the mold cavity to fill same, the material being progressively and continuously injected into the cavity as the table moves forwardly to form a sheet of continuously increasing length in correspondence to the movement of the table and the enlargement of the mold cavity. The movable table is in slideable engagement with a stationary bearing plate which functions as a closure member for the upper surface of the mold cavity.

Further embodiments of the present invention utilize a closed mold member having a mold cavity therein, which cavity is in communication with a feed member positioned along one side thereof for injecting plastic material into the mold cavity. Relative lengthwise movement of the mold relative to the feed member causes the plastic material to be injected into the mold cavity progressively throughout the length thereof for completely filling same.

DETAILED DESCRIPTION

The method of the present invention can best be understood by first considering an apparatus capable of performing this method, a preferred embodiment of this apparatus being illustrated in FIGS. 1–6.

Figures 1, 4, 6:
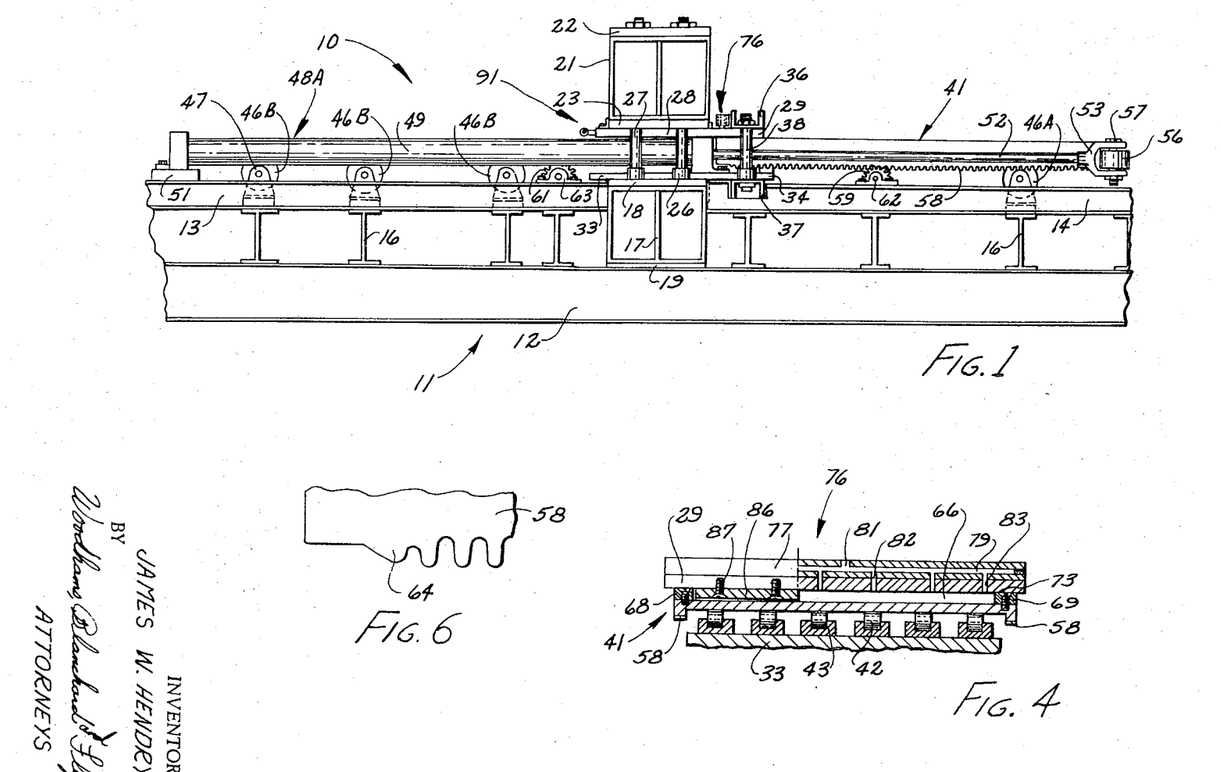
FIG. 1 is a side elevational view illustrating the preferred form of the apparatus for carrying out the present invention.
FIG. 4 is a cross-sectional view taken along the line IV—IV of FIG. 2.
FIG. 6 is an enlarged fragmentary view of the front end of the rack structure carried on the table.
Figure 2:
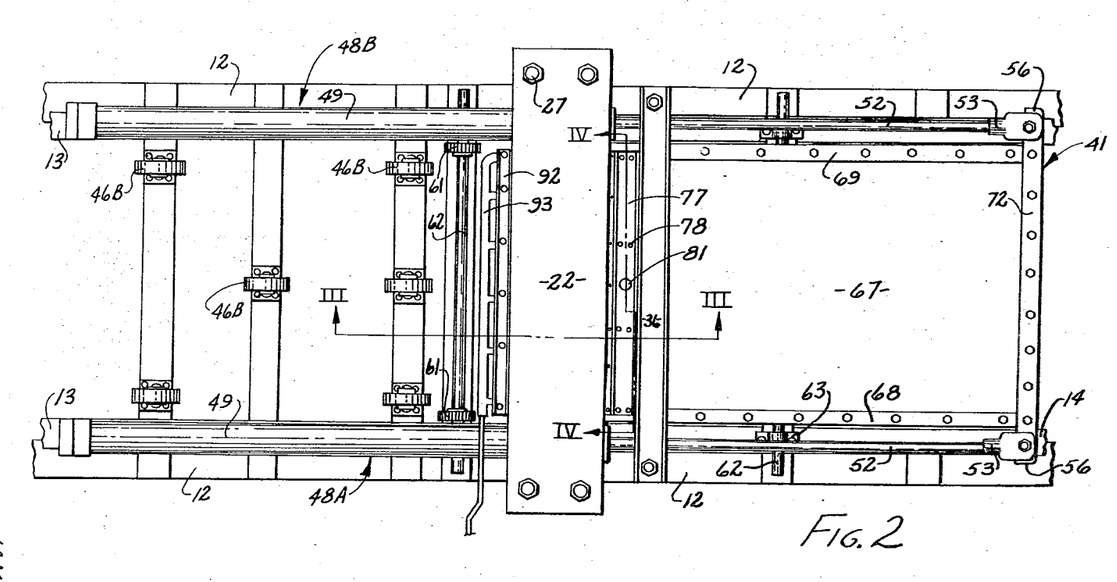
FIG. 2 is a top view of the apparatus as illustrated in FIG. 1 showing the movable table positioned adjacent the inlet end of the machine.

Referring more particularly to FIGS. 1 and 2, there is illustrated a sheet forming machine 10 capable of performing the present invention. The machine 10 is provided with a frame indicated generally at 11, which frame includes a pair of parallel lower beam members 12 and similar pairs of upper beam members 13 and 14. The upper and lower beam members are vertically spaced and fixedly interconnected by a plurality of transverse beam members 16 therebetween.

A lower support member 17 comprising a pair of substantially rectangular channel members fixedly connected together and having upper and lower bearing plates 18 and 19 fixedly secured thereon extends transversely across the lower beam members with the ends thereof extending substantially beyond the outer edges of the lower beam members 12. The upper beam members 13 and 14 abut and are fixedly interconnected to the sidewalls of the lower support member 17 in any suitable manner.

An upper support member 21 is positioned above and vertically spaced from the lower support member 17. The upper support member also comprises a pair of rectangular channel members fixedly interconnected with upper and lower bearing plates 22 and 23 being fixedly secured thereto. The upper support member 21 also extends substantially transverse to the upper and lower beam members 12, 13 and 14 and further has the ends thereof extending beyond the outer edges of the beam members.

The upper bearing plate 18 of the lower support member 17 is provided with a pair of threaded sleeves 26 fixedly positioned adjacent each end of the support member 17. The support members 17 and 21 are fixedly interconnected in vertical spaced relationship by means of threaded tie rods 27 which pass through the upper support member 21 and are threadedly received within the sleeves 26 substantially as illustrated in FIG. 1.

The frame 11 has been described in detail above merely for purposes of illustration and is not limiting since many other frames having the necessary strength and rigidity could be utilized.

Still considering FIGS. 1 and 2, an upper support plate 28 is fixed to the lower bearing plate 23 of the upper support member 21 by means of bolts 31, which support plate has a flat lower surface 32 thereon for a purpose to be explained hereinafter. As illustrated in FIG. 2, the upper support plate 28 does not extend completely across the length of the upper support member 21 but rather terminates substantially adjacent the inner edges of the upper beam members 13 and 14. Further, the support plate 28 has a width which is wider than the lower bearing plate 23 so as to form a substantially cantilever projection 29 extending toward the inlet end of the machine (rightwardly in FIG. 1).

A similar lower support plate 33 is fixedly secured to the upper bearing plate 18 of the lower support member 17. The lower support plate 33 has a configuration similar to the upper support plate 28 so as to form a cantilever projection 34 extending toward the inlet end of the machine in substantially parallel relationship to the cantilever projection 29 formed on the support plate 28.

To maintain the cantilevered projecting ends 29 and 34 in a fixed and parallel relationship, a holding means comprising a pair of channel members 36 and 37 is provided. The channel member 36 rests upon the upper surface of the upper support plate 28 and extends transversely thereacross. Similarly, the channel member 37 bears against the lower surface of the lower support plate 33 and extends transversely thereacross in parallel relationship to the channel member 36. The channel members are positioned substantially adjacent the free edge of the cantilevered projecting ends 29 and 34 and are fixedly interconnected by a pair of threaded tie bolts 38 which extend between and fixedly interconnect the channel members adjacent opposite ends thereof.

Positioned above the upper beam members 12 and adapted for movement between the support plates 28 and 33 is a movable table 41, which table functions as a mold member. The table 41 is partially supported by a plurality of support rollers 42 (FIG. 4) which rollingly engage the lower surface of the table. The support rollers 42 are positioned in a plurality of axially spaced rows by means of bearing blocks 43 fixedly secured to the support plate 33. As illustrated in FIG. 4, a plurality of axially aligned support rollers 42 are positioned within each row.

Figure 5:
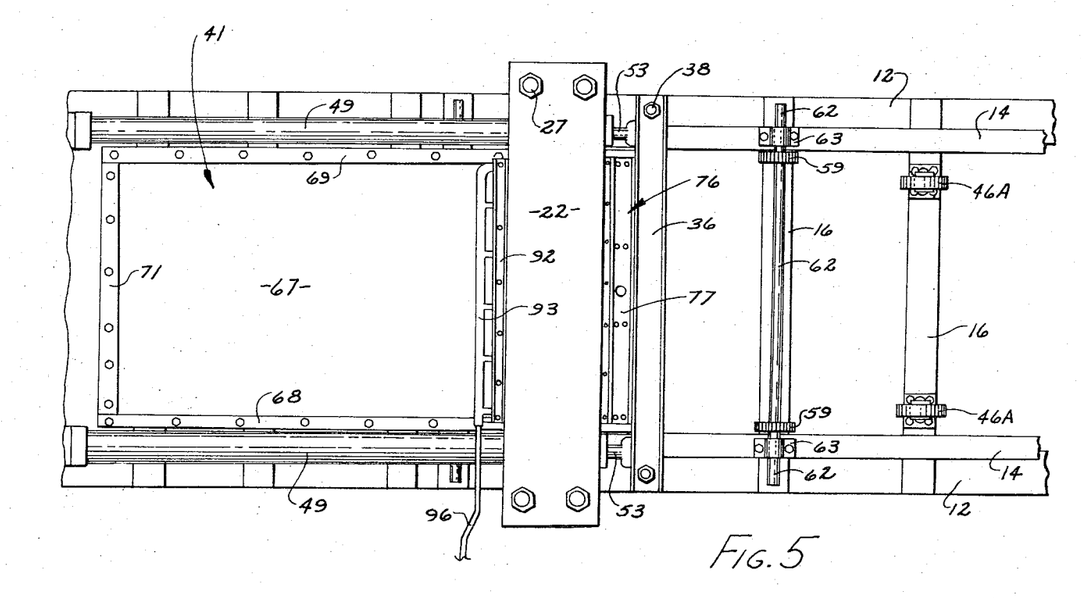
FIG. 5 is a top view of the apparatus similar to FIG. 2 but showing the movable table positioned adjacent the outlet end of the machine.
Figure 7:
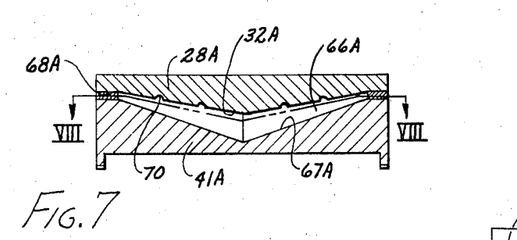
FIG. 7 is a cross-sectional view of the movable table illustrating same with a modified mold opening therein as taken along line VII—VII of FIG. 8.

FIGS. 2 and 5 illustrate that the sheet forming machine 10 is also provided with a plurality of identical guide rollers 46A and 46B at each end of the machine. The guide rollers are rotatably mounted within hanger members 47 which are fixedly secured to the transverse beam members 16. The guide rollers 46A and 46B are adapted to rollingly engage the lower surface of the table 41 and support same as the table linearly moves from the inlet end thereof as illustrated in FIG. 2 to the outlet end thereof as illustrated in FIG. 5. The guide rollers 46A and 46B are generally provided in a plurality of laterally spaced rows with a plurality of coaxially aligned rollers being in each row. However, the exact configuration and positioning of the guide rollers is a matter of design dependent upon the size and weight of the table utilized, and thus the configuration of FIGS. 2 and 5 is shown merely for purposes of illustration.

For linearly reciprocating the table 41 between the inlet and outlet ends of the machine as illustrated in FIGS. 2 and 5, respectively, there is provided a drive means 48 which includes a pair of identical drive devices 48A and 48B positioned on opposite sides of the machine frame, only one of which will be described in detail.

As illustrated in FIGS. 1 and 2, the drive device 48A preferably includes a fluid actuated power cylinder 49 which may be actuated either hydraulically or pneumatically. The rearward end of the power cylinder 49 is fixedly secured to a bearing plate 51 which in turn is fixedly secured to the upper beam member 13. The other end of the power cylinder, comprising the head end of the cylinder, is fixedly secured to the support plate 33. The piston rod 52 of the power cylinder extends outwardly from the head end thereof toward the inlet end of the machine (rightwardly in FIG. 1) and is provided with a yoke or clevis 53 fixedly secured on the end thereof. The table 41 is provided with an ear or projection 56 laterally extending from the edge thereof, which projection is received within the clevis 53 and is fixedly secured thereto by means of a bolt 57.

As illustrated in FIG. 2, a pair of identical power cylinders 49 are provided on opposite sides of the table and are interconnected thereto by means of piston rods 52 having yokes 53 secured to table projections 56. The pair of power cylinders 49 are each interconnected to a common power source (not shown) for simultaneous energization thereof so as to permit the table to be linearly reciprocated between the position illustrated in FIG. 2 and the position illustrated in FIG. 5. The power cylinders 49 are preferably of the double-acting type so that reverse energization of the power cylinders will cause the table to be returned from the FIG. 5 position to the FIG. 2 position.

To prevent misalignment or tilting of the table 41 during its linear movement, a guide means 60 cooperating between the movable table 41 and the stationary frame 11 is provided. The guide means 60 includes a pair of gear racks 58 which extend along the opposite longitudinal sides of the table and extend downwardly therefrom. A first pair of gear members 59 is positioned on the inlet side of the upper support member 21, the gear members being coaxially aligned on opposite sides of the table 41 substantially adjacent the parallel upper beam members 14. The first gear members 58 are each fixedly connected to a support shaft 62 extending therebetween for rotation therewith. The support shaft 62 is in turn rotatably supported at opposite ends thereof by means of journal bearings 63 fixedly secured to the upper beam members 14. A second similar pair of gear members 61 is provided on the outlet side of the upper support member 21, which gears are also positioned on opposite sides of the table 41 and are each fixedly secured to a common support shaft 62 extending therebetween, which shaft is rotatably supported in a pair of journal bearings 63 fixedly secured to the upper beam members 13.

In the position illustrated in FIGS. 1 and 2, the gear racks 58 are in meshing engagement only with the first pair of gear members 59, while in the position illustrated in FIG. 5, the gear racks 58 are in meshing engagement only with the second pair of gear members 61. However, in moving from the inlet end of the machine as illustrated in FIG. 2 to the outlet end of the machine as illustrated in FIG. 5, the gear racks 58 come into mesh with the second pair of gear members 61 before leaving meshing engagement with the first pair of gear members 59. To facilitate the initial meshing engagement of the gear racks with the respective gear members, each gear rack 58 is provided with a tapered ramp or tooth 64 at each end thereof substantially as illustrated in FIG. 6. The tapered tooth 64 thus causes slight angular movement of the gear members, if necessary, upon initial engagement therewith so as to permit proper meshing of the teeth on the gear rack with the teeth on the gear members.

Figure 3:
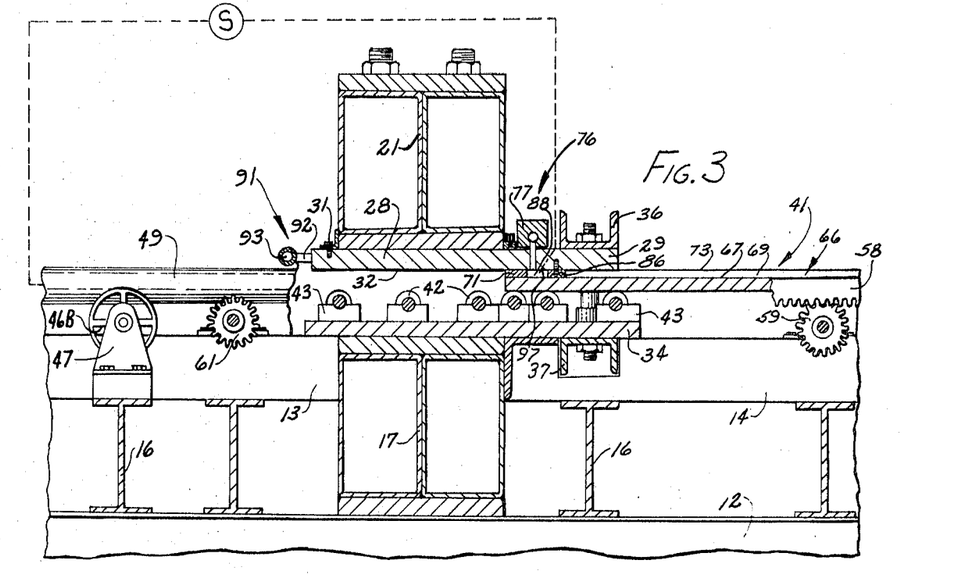
FIG. 3 is a cross-sectional view taken along the line III—III of FIG. 2.

The table 41 is further provided with a channel or mold opening 66 in the upper side thereof, the opening being bounded by the upper surface 67 of the table and being closed on the sides by the parallel longitudinal sidewall members 68 and 69 and by the front and rear transverse wall members 71 and 72, respectively, as illustrated in FIGS. 3 and 5. The wall members 68, 69, 71 and 72 define an upper guide surface 73 thereon which is adapted to slidingly engage the lower surface 32 of the support plate 28 when the table linearly reciprocates between the positions illustrated in FIGS. 2 and 5.

To permit molten plastic material to be injected into the mold opening 66, there is provided a feeding means 76 which includes a feed member 77 mounted to the upper surface of the cantilever projection 29 by any suitable means, such as by bolts 78 (FIG. 2). As illustrated in FIG. 4, the feed member 77 contains a transverse passageway 79 therein having an inlet opening 81 formed in the upper surface thereof communicating with the transverse passageway. The feed member 77 also contains a plurality of vertical passageways 82 which are laterally spaced across and in communication with the transverse passageway 79. A plurality of similar vertical passageways 83 pass through and are laterally spaced across the cantilevered projection 29 with the vertical passageways 83 being coaxially aligned with the respective passageways 82 formed in the feed member. The inlet opening 81 is adapted to be interconnected to any conventional plasticizing machine, extruder, or other source of plasticized material under pressure, for supplying molten plastic material to the sheet forming machine.

As illustrated in FIGS. 3 and 4, a stationary dam 86 is fixedly connected to the lower surface of the cantilevered portion 29 of the support plate 28. The dam 86 comprises a bar-shaped member which extends transversely across the table and is positioned substantially adjacent but slightly laterally spaced from the vertical passageways 83 in a direction toward the inlet end of the machine.

The dam 86, connected to the support plate 28 by a plurality of screws 87, is positioned within the mold opening 66 formed in the table 41 and is of a length whereby it extends substantially completely across the opening with the ends thereof being in close sliding engagement with the inner edges of the opposite sidewall members 68 and 69. The dam also is of a thickness substantially equal to but slightly less than the depth of the mold opening 66 whereby only a small sliding clearance exists between the lower surface of the dam and the lower surface of the mold opening as defined by the upper surface 67 of the table.

The stationary dam 86 thus cooperates with the front wall member 71 and the sidewall members 68 and 69 fixedly secured to the movable table 41 to define a mold cavity 88 which is closed on all four sides and the ends thereof. The upper side of the mold cavity 88 is closed by the support plate 28 which is in sliding engagement with the upper surfaces 73 of the front wall member 71 and the sidewall members 68 and 69. Further, the lower side of the mold cavity is defined by the upper surface 67 of the table 41. However, the mold cavity is in communication with the feed member 77 by means of the vertical passageways 83 formed in the support plate 28. The mold cavity 88 defined in this manner is thus a cavity of progressively increasing size due to the movement of the table 41 toward the outlet end of the machine (leftwardly in FIG. 1) relative to the stationary dam members 86.

The upper support plate 28 is further provided with a pressure switch 97 therein which extends into the mold cavity 88 as illustrated in FIG. 3. The pressure switch is connected to and controls a source of pressurized fluid S used for supplying pressurized fluid to the pair of power cylinders 49. The function of the pressure switch will be explained hereinafter.

To facilitate cooling of the plastic material contained within the mold cavity, a cooling means 91 is provided adjacent the outlet side of the upper support member 21. The cooling means 91 comprises a cooling block 92 fixedly secured to the edge of the support plate 28, which cooling block has a plurality of downwardly opening orifices therein spaced laterally across the width of the machine. A conduit 93 is fixedly secured to the block 92 and is connected to an inlet hose 96 for supplying cooling fluid, such as pressurized air, through the conduit into the cooling block whereby the cooling fluid is then discharged through the orifices so as to progressively cool the plastic sheet contained within the mold cavity 88 as the table progressively travels past the cooling block 92. The cooling means 91 has been illustrated merely for purposes of illustration since many other conventional types of cooling means could be used.

Figure 8:
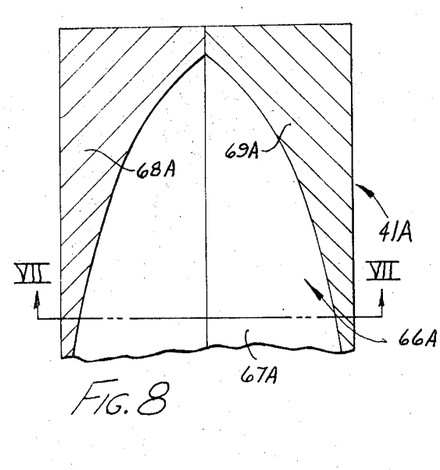
FIG. 8 is a partial sectional view as taken along line VIII—VIII of FIG. 7.

The method of forming large plastic sheets and the apparatus disclosed for performing this method is highly desirable not only because of its ability to form large plastic sheets having the desired uniformity, but also because the method and the apparatus are adaptable for forming large sheets having variable shapes or thicknesses across the width or length thereof. FIG. 1 illustrates the cross section of a modified movable table or mold 41A wherein the upper surface 67A of the table is formed with a downwardly converging V-shaped configuration. Similarly, the upper support plate 28A is modified such that the lower surface 32A thereof is also formed with a downwardly converging V-shaped configuration, which lower surface 32A is also formed with a plurality of longitudinally extending grooves 70 therein so as to form stiffening ribs on the sheet produced by the apparatus. The surfaces 67A and 32A thus cooperate to define a substantially V-shaped mold opening 66A, which mold opening is thicker along the center thereof than along the opposite sides. Such a mold opening could be utilized for forming the keel of a boat hull. Such a hull configuration is illustrated in FIG. 8 wherein the mold opening 66A is bounded on the sides thereof by the side plates 68A and 69A, both of which are fixedly secured to the movable table 41A. The side plates 68A and 69A can be of any desired configuration throughout the longitudinal length thereof and, as illustrated in FIG. 8 could converge inwardly so as to have the configuration of a boat hull if desired. In this situation, the side plates 68A and 69A would have to be formed with a configuration thereon complementary to the lower surface 32A of the upper support plate 28A so as to be slideably engageable therewith to seal off any of the material inlet openings not in communication with the mold opening 66A.

OPERATION

Although the operation of the device embodying the invention has been indicated somewhat above, said operation will be described in detail hereinbelow for a better understanding of the invention.

Considering first the manner in which the movable table 41 is supported and moved during each cycle of operation, assuming the machine to be in the position as illustrated in FIGS. 1 and 2, the table 41 is reciprocably supported on the support rollers 42 adjacent the front end thereof and is reciprocably supported upon the guide rollers 46A positioned adjacent the inlet end of the machine (rightward end in FIG. 1) substantially as illustrated in FIGS. 1 and 2. Further, the gear racks 58 positioned on opposite sides of the table are both in meshing engagement with the first pair of gear members 59, which gear members are each fixedly connected to a common support shaft 62 for synchronous rotation therewith. The leading edge of the table 41 is positioned between the support plates 28 and 33 with the upper guide surfaces 73 being in sliding engagement with the lower surface 32 of the upper support plate 28.

To move the table 41 toward the outlet end of the machine (leftwardly in FIG. 1), the pair of power cylinders 49 are simultaneously energized from a common pressure source whereby the piston rods 52 are retracted (leftwardly in FIG. 1) causing the table 41 to be pulled leftwardly between the support plates 28 and 33 toward the position illustrated in FIG. 5. As the above movement progresses, the leading edge of the table comes into contact with and is supported by guide rollers 46B positioned adjacent the outlet end of the machine. Similarly, the leading edge of the gear racks 58 come into contact with the second pair of gear members 61 and, shortly thereafter, the trailing edges of the gear racks move out of meshing engagement with the first pair of gear members 59. Since each pair of gear members is keyed together for synchronous rotation, table 41 is accurately guided for straight linear movement since the gear members prevent the table from being misaligned or tilted in the horizontal plane due to any differential pulling force which might exist between the two power cylinders 49.

After the table 41 reaches the position illustrated in FIG. 5, power cylinders 49 are energized in the reverse direction whereby the table is then moved back toward the inlet end of the machine (rightwardly in FIG. 1) until same reaches its initial position substantially as illustrated in FIG. 2. If desired, suitable limit stops can be fixedly secured relative to the frame to control the extreme table positions. Also, suitable limit switches can be provided at these extreme positions if desired for automatically controlling the flow of pressurized fluid to the power cylinders and the flow of molten material to the mold cavity.

Considering now the manner in which the plastic sheet is formed, and again assuming that the machine is in the initial position illustrated in FIGS. 1 and 2, the inlet opening 81 of the feed member 77 is connected to an external material supply means, such as a conventional plasticizing apparatus, for supplying molten plasticized material to the mold cavity 88. Upon initiation of flow of material into the inlet opening 81, the plasticized material will flow through the transverse passageway 79 and then through the plurality of aligned vertical passageways 82 and 83 into the small mold cavity 88 as defined by the front wall member 71, the stationary dam member 86, and the parallel sidewall members 68 and 69 (see FIG. 3). Thus, the initial flow of material into the mold cavity will substantially completely fill the small mold cavity as initially present.

When the material within the small mold cavity 88 reaches a predetermined pressure level, it will cause the pressure switch 97 to be activated whereupon the power source S will be energized so as to supply pressurized fluid to the pair of power cylinders 49. The power cylinders 49 will thus be energized so as to initiate slow linear movement of the table 41 toward the outlet end of the machine (leftwardly in FIG. 1). This forward movement of the table 41 will cause the front wall 71 of the table to be moved away from the stationary dam member 86 causing a progressive enlargement of the mold cavity 88. However, during this linear movement of the table, molten material will be continually injected through the passageways 83 into the mold cavity 88 so as to substantially maintain the continually enlarging mold cavity 88 substantially full of molten plastic material. This desired relationship is achieved by providing a sufficient number of vertical inlet passageways 83 having the desired cross-sectional area and by injecting the molten plastic into the mold at a suitable pressure in proportion to the speed of movement of the table 41.

However, if the speed of movement of the table 41 should exceed the rate of flow of material into the mold cavity 88 so as to cause the pressure within the mold cavity to drop below the preselected value, then the pressure switch 97 will be de-activated so as to de-energize the power source S, whereupon the power cylinders 49 will temporarily discontinue, or slow, movement of the table 41 until the pressure within the mold cavity again reaches the preselected level. In this manner, the pressure switch 97 controls the movement of the table 41 in proportion to the rate of flow of material supplied to the mold cavity, which rate of flow often is subjected to pulsations or variations depending upon the source of molten material utilized. For example, if a conventional extruder is utilized to supply molten material to the mold cavity, then the pressure switch 97 is necessary since such extruders produce substantial pulsations in the flow output. However, if the device utilized for supplying molten material to the mold cavity has a fairly constant output, then the pressure switch 97 could be eliminated and the table moved at a constant rate.

The molten material contained within the mold cavity 88 is formed into a smooth flat sheet by the lower surface 32 of the support plate 28 as the table moves progressively thereunder. Further, as the sheet material moves past the outlet edge of the support plate 28, the sheet is partially cooled due to the cooling means 91.

After a sheet of the desired length has been formed, or alternatively, when the end of the table is reached, the flow of material through the feed member 77 is stopped so as to prevent further material from flowing into the mold cavity 88. The sheet of material is then removed from the mold cavity either by continuing to move table 41 forwardly toward the outlet end of the machine until the complete sheet is removed from underneath the support plate 28 or, alternatively, the table can be retracted into its initial position as illustrated in FIG. 2 with the sheet being removed in this latter position. If the sheet is removed by returning the table to the initial position as illustrated in FIG. 2, the rear wall member 72 extending across the rearward end of the table can also function as a stop means for limiting the forward movement of the table with respect to the stationary dam 86. However, if the sheet is removed at the outlet end of the machine, rear wall member 72 is removed from the table to permit the table to be moved sufficiently past the stationary dam 86 to facilitate removal of the sheet.

Figure 9:
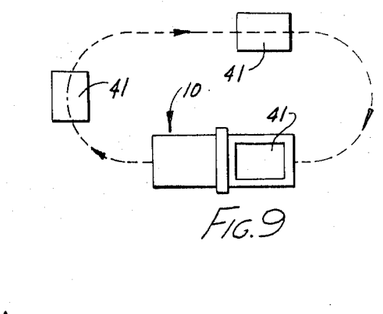
FIG. 9 is a schematic flow diagram of an alternate method of operation of the sheet forming apparatus.

While the apparatus illustrated in FIGS. 1–6 discloses the machine as utilizing a reciprocating movement for the table 41, it will be apparent that the apparatus could be of the continuous-flow type, substantially as illustrated in FIG. 9. FIG. 9 schematically illustrates the sheet forming machine 10 cooperating with a plurality of movable tables 41, three such tables being illustrated. In such a continuous-flow situation, suitable conveyor means are positioned adjacent the inlet and outlet ends of the machine and form a loop or path therebetween whereupon the movable tables after being filled with plastic material leave the outlet end of the machine and move by means of suitable conveyor means back to the inlet end of the machine for the formation of a new sheet. While the tables are being moved from the outlet end of the machine back to the inlet end of the machine, suitable mechanical or manually operated means can be utilized for removing the formed sheets from the tables. Such a circular flow pattern permits the sheet forming apparatus 10 to continuously form sheets by utilizing a plurality of tables in cooperation therewith, thus greatly increasing the productivity and efficiency of the apparatus.

MODIFICATIONS

FIGS. 10–15 illustrate a modification of a sheet forming apparatus constructed in accordance with and capable of performing the method of this invention.

Figure 10:
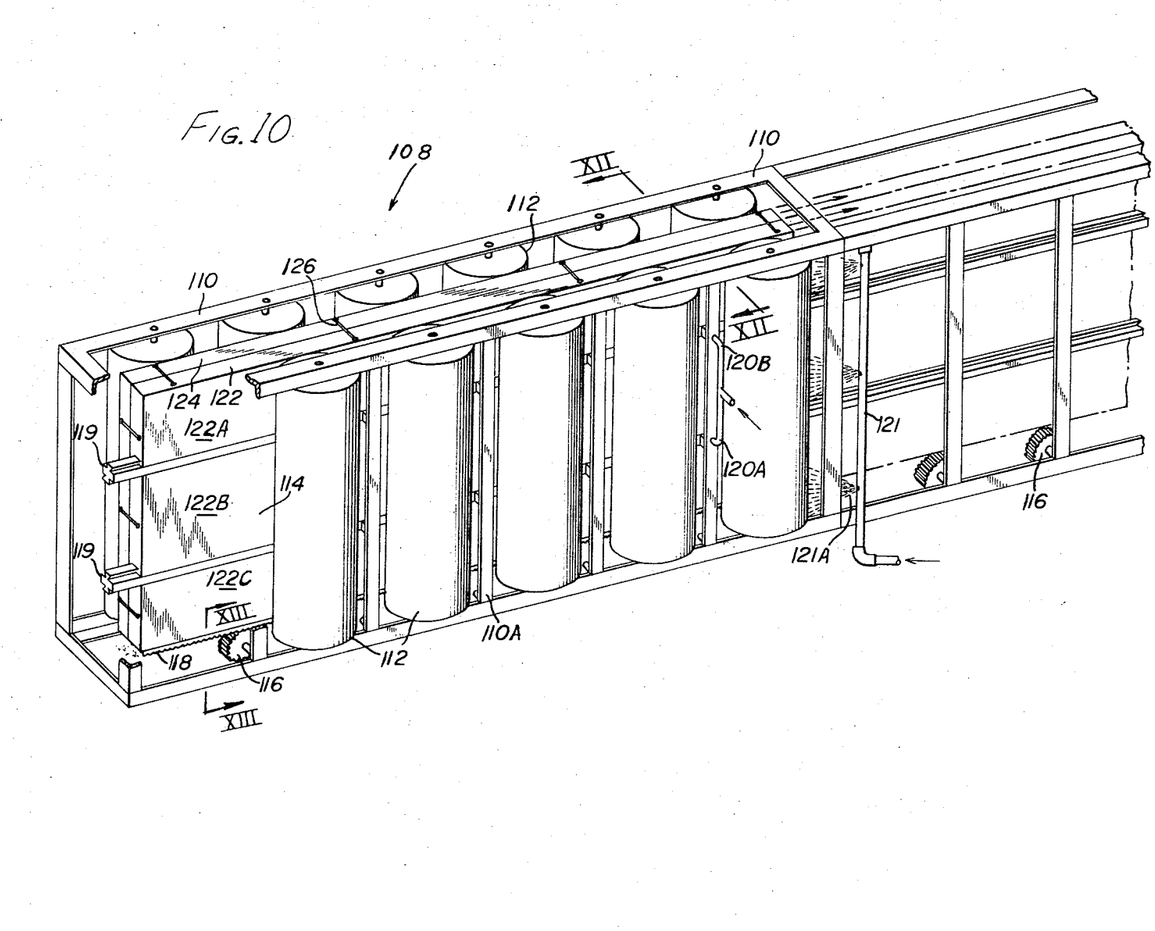
FIG. 10 is a partially broken away perspective view of another embodiment of a sheet forming apparatus constructed in accordance with this invention.

Referring more particularly to FIG. 10, there is illustrated a perspective view of a sheet forming machine generally designated as 108 and being comprised of a frame 110, which frame may be constructed of angle iron or the like. Frame 110 has a plurality of vertical rollers 112 mounted along the edges thereof, which rollers 112 are positioned along the opposite edges of the frame 110 and are in rolling engagement with the opposite sides of a mold member 114. Mold member 114 is provided with a rack means 118 at the base thereof which is in meshing engagement with pinion gears 116. The gears 116 and the rack means will be more particularly described with reference to FIG. 13.

In the embodiment shown in FIG. 10, guide means in the form of runner feeding members 119 are horizontally mounted on vertical frame supports 110A of frame 110, which runner members serve as an integral portion of one side of mold 114 and also on which mold 114 slides to the right as shown. The runner members 119 extend the full length of the apparatus 108 and a plastic injecting conduit 120 extends into and through members 119 to inject plastic into cavity 128 (FIG. 12) of mold 114. The details of the runner members 119 as well as the plastic injecting conduit 120 will be more fully understood hereinafter.

The plastic injecting conduit 120 illustrated in FIG. 10 is provided with legs 120A and 120B which extend through feeding members 119. The number of members 119 utilized will, of course, depend on the size of the plastic sheet being formed. For purposes of illustration, FIG. 10 shows two members 119 and, when the mold member 114 is at its starting position for filling; the plastic injecting conduit 120 is at the forward end of mold 114.

An upright member 121 serves as a sprayer to cool the mold after the mold, as shown in FIG. 10, is advanced to the right. Sprayer 121 is placed sufficiently to the right of the mold member 114, as shown, so as not to cool the mold prior to substantially completely filling that portion of the mold being cooled.

Mold 114 is comprised of a right half 122 and a left half 124 as shown in FIG. 10. The right half 122 is comprised of an upper portion 122A, an intermediate portion 122B, and a lower portion 122C, which portions serve as a single monolithic surface being separated by runner feeding members 119. In this embodiment of the invention shown in FIG. 10, mold 114 is slideable on runner feeding members 119. The left half 124 of mold is continuous and comprised of one complete section. The left and right halves 122 and 124 are fastened together by fastening means 126. Though the fastening means are shown as spaced given distances apart on the upper and end surfaces of the mold member 114, the number of fastening means 126 is dependent upon the amount of internal pressure exerted on the mold member while injecting plastic therein. The fastening means 126 are shown as hinge bolts such as are well known in the art; however, other means of fastening the mold halves together are equally operable.

Figure 11:
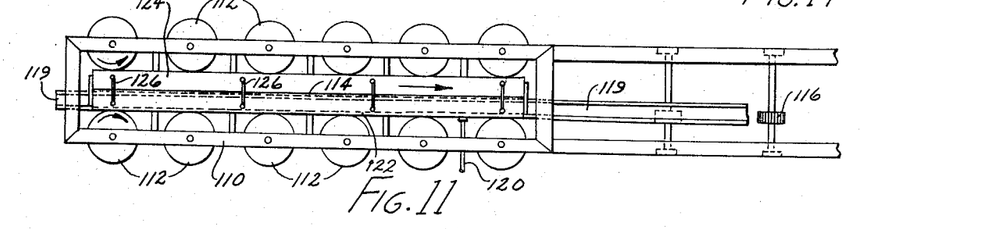
FIG. 11 is a fragmentary elevational view of a portion of the apparatus in FIG. 10.

Referring to FIG. 11, it will be noted that the runner feeding members 119 serve to support the right side 122 of the mold. As the mold 114 is moved to the right, plastic is injected through conduit 120 into the mold cavity.

As illustrated in FIG. 12, plastic is injected through conduit 120 and legs 120A and 120B and then through runner members 119 into the mold cavity 128. It will be noted that the mold 114 is moved and the runner members 119 remain stationary to thereby fill the mold cavity 128 with plastic material as the mold cavity is moved to the right as shown in FIG. 10.

The mold 114 is vertically supported by means of the rack 118 fixedly secured to the lower edge thereof, which rack is in meshing engagement with some of the pinion gears 116 as illustrated in FIG. 10. The pinion gears 116 are each mounted on a shaft 115 (FIG. 13) which in turn is journalled in a bearing 113 fixedly mounted on the frame 110.

Figure 14:
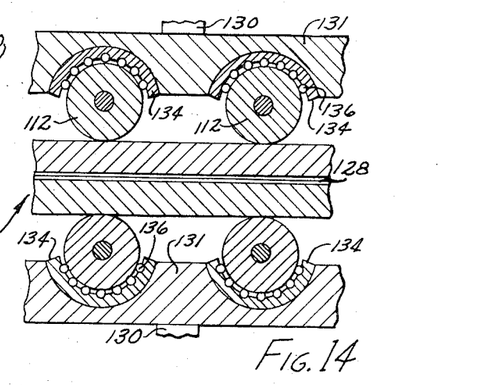
FIG. 14 is a broken away cross-sectional view of a hydraulic pressure applying apparatus that may be used with that apparatus shown in FIG. 10.

While in many situations the presence of the rollers 112 mounted within the frame 110 may be sufficient to hold the mold halves 122 and 124 together in tight clamping engagement, it may be necessary to supply additional external clamping devices so as to provide sufficient clamping force for holding the mold sections in a closed position. FIG. 14 illustrates in cross-sectional view a modified frame construction 131 used in conjunction with an external clamping mechanism in the form of hydraulic cylinders 130 which may be utilized to apply an external clamping force to the mold for holding same in the closed position. As illustrated in FIG. 14, force is applied by the hydraulic cylinder 130 onto the frame member 131 containing horizontal rollers 112 therein. The frame contains a bearing 134 with roller bearings 136 therein for rotatably supporting each roller with respect to the frame. The roller bearings may be long or short as necessary to receive the necessary force exerted by hydraulic cylinder 130.

It will of course be understood that use of a hydraulic cylinder 130 as a clamping means necessitates the use of a pair of such cylinders positioned on opposite sides of the frame 131 so as to apply an equal force on opposite sides of the mold 114. The desirable amount of pressure applied to the sides of the mold forming apparatus is dependent upon the type of plastic being injected into the mold member 114 as well as the size of the sheet being formed. It will be understood that greater pressures may be required as the sheet thickness is reduced. The apparatus of this invention may, of course, be utilized on extraordinary thin sheets, that is, sheets in the order of one-eighth inch to one-quarter inch and may also be used on sheets having a thickness which approaches one-half inch to three-quarters inch, the thickness being dependent on the end use of the sheet material. While the clamping apparatus illustrated in FIG. 14 is not required during normal operations, it may be utilized if greater pressures are required on the sides of the molding forming apparatus.

Figures 13, 15:
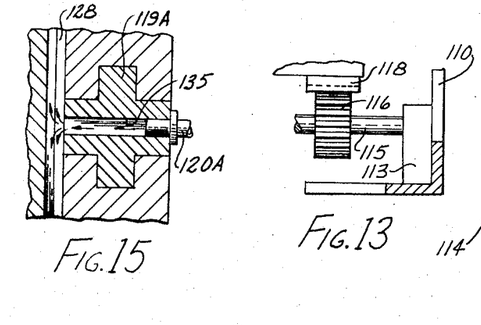
FIG. 13 is a cross-sectional view taken on line XIII-—XIII of FIG. 10.
FIG. 15 is a cross-sectional view of a second embodiment of a runner feeding member.

If desired, the runner member 119 illustrated in FIG. 12 may have a cross-sectional configuration of the type illustrated by the runner member 119A in FIG. 15. The runner member 119A as illustrated in FIG. 15 does not interlock with the mold members as does the one shown in FIG. 12 and, accordingly, it is easier and more economical to manufacture.

Figure 16:
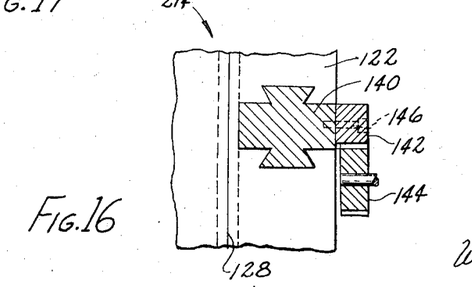
FIG. 16 is a broken away cross sectional view of the runner feeding member utilized in FIG. 17.
Figure 17:
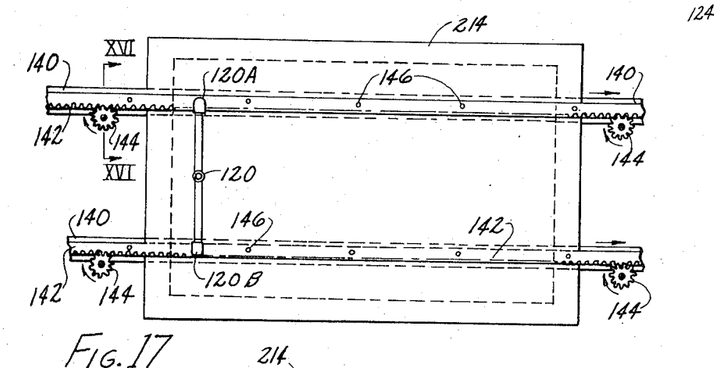
FIG. 17 is a perspective view of a third embodiment of a sheet forming apparatus constructed in accordance with this invention wherein moving runner feeding members are utilized.

FIGS. 16 and 17 disclose an alternate method for filling the mold cavity of the mold member illustrated in FIG. 10. As illustrated, this embodiment utilizes a moving runner feed member 140, which member has a rack means 142 attached thereto in meshing engagement with a pinion gear 144 adapted to be rotatably mounted on the surrounding frame. Rotational movement of the pinion gear causes the runner member 140 to be moved to the right as illustrated in FIG. 16. In this embodiment, the mold 214 is constructed in the same manner as is the mold 114 illustrated in FIG. 10 except that the mold 214 in the embodiment illustrated in FIG. 16 is held stationary with respect to the frame.

It will be noted in FIG. 17 that the rack 142 is attached externally of the runner member 140 and the teeth of the rack 142 do not interfere with the runner member 140 which serves as an integral portion of the right side 222 of the mold 214. The rack 142 may be attached to the runner member 140 by means of pins 146 as illustrated in FIGS. 16 and 17.

In the forming of plastic sheets with the apparatus as shown in FIGS. 10–15, plastic material is injected into conduit 120 by an injection molding machine (not shown). As plastic enters the mold cavity 128 (FIG. 12), it fills the forward portion of the mold 114. Pinion gears 116 are driven in a clockwise direction by any suitable driving apparatus (not shown) to move mold 114 to the right. As mold 114 moves to the right as shown in FIG. 10, the cavity 128 of the mold continues to fill and mold 114 slides on runner feeding members 119 which are attached to the vertical frame members of frame 110. As the mold cavity is filled and the mold moves to the right, the mold passes sprayer 121 where cooling water is sprayed on the outer portion of the mold to cool it to room temperature. When the mold 114 completely passes to the right of conduit 120, the mold cavity is completely filled and the plastic material passing through conduit 120 is stopped. The mold then passes out of the enclosed frame 110 and the sheet is then removed from the mold.

Pinion gears 116 may be driven by any suitable power source such as an electrical motor or, alternatively, a cable may be attached to the mold 114 (not shown) to pull the mold to the right over the gears 116.

In the alternative embodiment shown in FIG. 16, mold 214 is filled by moving runner feeding members 140 to the right by means of clockwise movement of pinion gears 144 on rack 142. It will be noted that plastic feeding conduit 220 will also move to the right which will necessitate a mobile injection molding machine.

It will be observed that the embodiments of the present invention illustrated in FIGS. 10–17 do not utilize a stationary dam member within the mold cavity, such as the dam member 86 in the embodiment illustrated in FIGS. 1–6. Instead, the function of said dam member is performed by the material injected into the mold cavity and uniformly distributed across the width of the cavity, particularly, when the mold cavity of the apparatus illustrated in FIGS. 10–17 is relatively thin, or is being filled with a molten plastic having a high viscosity. In such case, the molten material initially entering the mold cavity tends to flow outwardly in all directions and a quantity of material consequently becomes laterally displaced from the inlet openings in a direction toward the remote end of the mold cavity. This quantity of material then functions substantially as a movable dam member, defining a partial mold cavity between this quantity of material and the near end of the mold, which partial mold cavity progressively increases in size as relative movement occurs between the mold and the feed means. However, as this relative movement occurs, this quantity of material tends to move linearly throughout the length of the mold cavity until reaching the remote end thereof, at which time the complete mold cavity has been filled with material. While this procedure is satisfactory in some cases, particularly where the viscosity of the material is not too high, in other situations this moving quantity of material is undesirable since it tends to become charred or degraded and consequently causes impure particles to become trapped in the resulting sheet structure. Thus, the embodiment illustrated in FIGS. 1–6 wherein a fixed structural dam member is utilized is normally preferred.

The method of forming large plastic sheets and the apparatus disclosed for performing this method is highly desirable not only because of its ability to form large plastic sheets having the desired uniformity, but also because the method and the apparatus are adaptable for forming sheets having different desired physical properties and characteristics. For example, the present invention is well adapted to the formation of large plastic sheets having patterns formed on the surfaces thereof. In the apparatus disclosed in FIG. 1, the lower surface 69 of the table could have a suitable pattern formed thereon so as to produce a sheet having a pattern on one side. In a similar manner, the mold disclosed in the apparatus of FIGS. 10 and 16 could also have patterns formed on both sides thereof so as to produce a sheet having a pattern on opposite sides.

Further, the mold opening could have ribs or other thickenings along the center, the sides, or elsewhere as desired, such as to provide a preform for special uses. Additionally the mold cavity could have a shaped configuration, as arcuate or V-shaped, when viewed in the cross-sectional direction with the stationary dam 86 also being formed with a shaped configuration compatible to the mold opening 66. Further, the apparatus can be used to produce nonrectangular sheets.

Although particular preferred embodiments of the invention have been disclosed above for illustrative purposes, it will be understood that variations or modifications thereof which lie within the scope of the appended claims are fully contemplated.

The embodiments of the invention in which an exclusive property or privilege is claimed are defined as follows:

1. An apparatus for molding plastic sheets, comprising:
    a frame;
    mold means supported on said frame and having a mold cavity therein;
    feed means for supplying molten plastic material to said mold cavity;
    drive means for causing relative longitudinal movement between said feed means and at least a portion of said mold means, said feed means causing molten plastic material to be progressively injected into the mold cavity from one end toward the other end thereof as said feed means moves relative to said portion of said mold means; and
    pressure-sensing means disposed adjacent the mold cavity and responsive to the pressure of the molten material within the mold cavity for controlling actuation of said drive means.

2. An apparatus according to claim 1, in which the mold means includes first and second mold members mounted for relative longitudinal motion therebetween, said first and second mold members respectively having first and second walls mounted thereon and disposed in opposed relationship for defining therebetween a mold cavity of variable volume, said end walls being initially positioned closely adjacent one another and being relatively movable away from one another to define a mold cavity of progressively increasing volume in response to the drive means being energized by the pressure-sensing means.

3. An apparatus according to claim 2, in which the first and second mold members are mounted for substantially linear relative motion therebetween, and the pressure-sensing means including a pressure switch means at least partially positioned within the mold cavity and responsive to the pressure of the molten material within the cavity and interconnected to the drive means for controlling energization thereof, said pressure switch means energizing the drive means for causing progressive enlarging of the mold cavity only when the pressure of the molten material within the mold cavity reaches a magnitude sufficient to indicate that the mold cavity is substantially filled with material, the pressure switch means thus causing the progressively increasing mold cavity to be substantially filled with material at all times.

4. An apparatus for molding plastic sheets, comprising:
    mold means including a pair of opposed, separable closure members defining a closed mold cavity of predetermined volume therebetween;
    guide means supporting said mold means for relative slideable linear movement therebetween, said guide means including an elongated guide member associated with and comprising a part of one of said closure members, said elongated guide member having a first surface thereon in slideable engagement with said one closure member and a second surface thereon partially defining said mold cavity;
    feed means for supplying molten plastic material to said mold cavity, said feed means being fixedly interconnected to said guide means and including passageway means attached to and extending through the elongated guide member, the passageway means being in communication with the mold cavity whereby relative linear movement between the guide member and the mold means permits molten plastic material to be injected into the mold cavity throughout substantially the full length thereof; and
    means interconnected to one of said mold means and said guide means for moving one relative to the other, the other of said mold means and said guide means being held stationary.

5. An apparatus according to claim 4, in which the one closure member includes at least two separate portions disposed on opposite sides of and in slideable bearing engagement with the elongated guide member.

6. An apparatus according to claim 4, in which said guide means includes a pair of substantially parallel, elongated guide members, each having a first surface thereon in slideable engagement with said one closure member and a second surface thereon partially defining said mold cavity, the first and second surfaces on each of the elongated guide members extending at an angle relative to one another, and said feed means including a passageway extending through each of the guide members for communication with the mold cavity.

7. An apparatus according to claim 4, in which the guide member extends throughout substantially the complete length of the mold cavity in the direction of linear movement.

8. An apparatus according to claim 4, in which the guide member comprises an elongated rail-like member having a length in the direction of linear movement substantially greater than the length of said mold means.

9. An apparatus according to claim 8, wherein said rail-like member has a substantially cross-shaped cross section.

10. An apparatus according to claim 8, in which said guide member is stationary and said mold means slideably moves therealong, and a plurality of roller means rollingly engaging the opposite external surfaces of said mold means for maintaining said closure members together.

11. An apparatus for molding plastic sheets, comprising:
    mold means including first and second opposed closure members defining a mold cavity therebetween and supported for relative longitudinal movement therebetween, the first of said members having side walls and an end wall, the side walls of which slide against the second member;

feed means communicating with said mold cavity for supplying molten plastic material thereto, said feed means being fixedly interconnected with respect to one of said closure members whereby relative longitudinal movement between said closure members permits said feed means to inject molten plastic material into said mold cavity progressively from a location at least near one end thereof to a location at least near the other end thereof;

drive means connected to the mold means for controlling movement of one closure member relative to the other in a linear path to increase the size of the mold cavity progressively from a location near one end thereof to a location near the other end thereof; and a wall member fixed to the second closure member and extending thereacross transversely to the direction of relative movement, providing an end closure opposed to said end wall and extending between said side walls so that material fed into the mold cavity can be maintained under a positive controlled pressure within the mold cavity.

12. An apparatus for molding plastic sheets, comprising:

mold means including a pair of opposed closure members defining a mold cavity therebetween, said pair of closure members being mounted for relative longitudinal movement therebetween and comprising upper and lower mold sections, the lower mold section having the entire mold cavity formed therein with the mold cavity defining an upwardly directed opening in the upper surface of the lower mold section, the lower mold section further including wall members at least partially surrounding the sides of the opening, the upper mold section being slideably disposed on the upper surfaces of the wall members and coacting with the lower mold section for closing the mold cavity;

feed means in communication with said mold cavity for supplying molten plastic material into said mold cavity progressively from a location at least near one end thereof to a location at least near the other end thereof;

means coacting with said mold means for causing relative longitudinal movement between said pair of closure members, said means including drive means interconnected to the lower of said mold sections for causing controlled slideable linear movement thereof;

material-confining means coacting between said pair of closure members for defining within the mold cavity a substantially closed material-receiving cavity which is of variable volume in dependence upon the relative position of the pair of closure members, said feed means being in communication with said material-receiving cavity for supplying molten plastic material thereto, said material-confining means including a confining member fixedly secured to the upper mold section and extending into and across the mold cavity in the lower mold section in a direction substantially transverse with respect to the direction of movement between the mold sections, the confining member being substantially in sliding engagement with the respective opposed side walls and bottom wall of the opening and being disposed opposite an end wall on the lower mold section for defining the material-receiving cavity therebetween, whereby relative sliding movement between the upper and lower mold sections causes the material-receiving cavity to progressively increase in size;

said feed means being fixedly interconnected with respect to the upper mold section and including passageway means in communication with the material-receiving cavity substantially adjacent the confining member, the upper mold section being fixedly interconnected to a stationary frame in a substantially horizontal position; and guide means supporting the lower mold section on the frame for linear movement in a substantially horizontal direction.

* * * * *